(12) United States Patent
Farrett

(10) Patent No.: US 7,107,261 B2
(45) Date of Patent: Sep. 12, 2006

(54) SEARCH ENGINE PROVIDING MATCH AND ALTERNATIVE ANSWER

(75) Inventor: Peter W. Farrett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/153,015

(22) Filed: May 22, 2002

(65) Prior Publication Data

US 2003/0220909 A1 Nov. 27, 2003

(51) Int. Cl.
*G06F 17/30* (2006.01)

(52) U.S. Cl. .................. 707/3; 707/1; 707/4; 707/5; 707/6

(58) Field of Classification Search ............... 707/2–5; 704/1, 10
See application file for complete search history.

(56) References Cited

U.S. PATENT DOCUMENTS

| | | | | |
|---|---|---|---|---|
| 4,942,526 A | * | 7/1990 | Okajima et al. | ............... 704/10 |
| 5,377,103 A | | 12/1994 | Lamberti et al. | |
| 5,634,051 A | | 5/1997 | Thomson | |
| 5,696,981 A | * | 12/1997 | Shovers | ................. 704/10 |
| 5,717,914 A | | 2/1998 | Husick et al. | |
| 5,778,157 A | | 7/1998 | Oatman et al. | |
| 5,913,215 A | * | 6/1999 | Rubinstein et al. | ............ 707/10 |
| 5,933,827 A | | 8/1999 | Cole et al. | |
| 5,970,499 A | | 10/1999 | Smith et al. | |
| 5,995,955 A | | 11/1999 | Oatman et al. | |
| 6,009,459 A | | 12/1999 | Belfiore et al. | |
| 6,029,165 A | | 2/2000 | Gable | |
| 6,078,914 A | | 6/2000 | Redfern | |
| 6,086,617 A | | 7/2000 | Waldon et al. | |
| 6,108,686 A | | 8/2000 | Williams, Jr. | |
| 6,167,370 A | | 12/2000 | Tsourikov et al. | |
| 6,178,420 B1 | * | 1/2001 | Sassano | ........................ 707/6 |
| 6,192,354 B1 | | 2/2001 | Bigus et al. | |
| 6,199,081 B1 | | 3/2001 | Meyerzon et al. | |
| 6,212,518 B1 | | 4/2001 | Yoshida et al. | |
| 6,510,406 B1 | * | 1/2003 | Marchisio | ...................... 707/3 |
| 6,728,704 B1 | * | 4/2004 | Mao et al. | ..................... 707/3 |
| 2001/0005847 A1 | * | 6/2001 | Wachtel | ........................ 707/1 |
| 2002/0099696 A1 | * | 7/2002 | Prince | ........................... 707/3 |
| 2004/0167931 A1 | * | 8/2004 | Han | ....................... 707/104.1 |

* cited by examiner

*Primary Examiner*—Frantz Coby
*Assistant Examiner*—CamLinh Nguyen
(74) *Attorney, Agent, or Firm*—Douglas A. Lashmit; Hoffman, Warnick & D'Alessandro LLC

(57) ABSTRACT

A search engine that is client-side, provides high performance and creates a user preference history record relative to a knowledge base is provided. The more time the user spends using the search engine, the more the history record is updated, refined, and translated into personal preferences relative to that knowledge base. The invention is natural language based. In addition, it is applicable to a variety of knowledge bases, each which may have their own associated history record, and can be adapted to other applications such as on-line help, interactive training, wizard functions, virtual chat sessions, intelligent bots, etc.

15 Claims, 8 Drawing Sheets

Probability Matrix Table

| 64 ↘ | cat. 1 | cat. 2 | cat. 3 | cat. 4 | ... | Cat. 12 | ... |
|---|---|---|---|---|---|---|---|
| cat. 1 | x | 0.1 | 0.1 | 0.2 | ... | 0.3 | ... |
| cat. 2 | 0.1 | x | 0 | 0 | ... | 0 | ... |
| cat. 3 | 0.1 | 0 | x | 0 | ... | 0 | ... |
| cat. 4 | 0.2 | 0 | 0 | x | ... | 0 | ... |
| ... | ... | ... | ... | ... | x | 0 | ... |
| cat. 12 | 0.3 | 0 | 0 | 0 | ... | x | ... |
| ... | ... | ... | ... | ... | ... | ... | x |

FIG. 6

Initial History Record

|  | cat. 1 | cat. 2 | cat. 3 | cat. 4 | ... | Cat. 12 | ... |
|---|---|---|---|---|---|---|---|
| cat. 1 | x | 0.1 | 0.3 | 0.3 | ... | 0.3 | ... |
| cat. 2 | 0.1 | x | 0.2 | 0 | ... | 0 | ... |
| cat. 3 | 0.3 | 0.2 | x | 0.1 | ... | 0 | ... |
| cat. 4 | 0.3 | 0 | 0.1 | x | ... | 0 | ... |
| ... | ... | ... | ... | ... | ... | x | ... |
| cat. 12 | 0.3 | 0 | 0 | 0 | x | ... | ... |
| ... | ... | ... | ... | ... | ... | ... | x |

FIG. 7

Updated History Record

|  | cat. 1 | cat. 2 | cat. 3 | cat. 4 | ... | cat. 12 | ... |
|---|---|---|---|---|---|---|---|
| cat. 1 | x | 0.2 | 0.4 | 0.5 | ... | 0.6 | ... |
| cat. 2 | 0.2 | x | 0.2 | 0 | ... | 0 | ... |
| cat. 3 | 0.4 | 0.2 | x | 0.1 | ... | 0 | ... |
| cat. 4 | 0.5 | 0 | 0.1 | x | ... | 0 | ... |
| ... | ... | ... | ... | ... | ... | x | ... |
| cat. 12 | 0.6 | 0 | 0 | 0 | x | ... | ... |
| ... | ... | ... | ... | ... | ... | ... | x |

FIG. 8

SEARCH ENGINE PROVIDING MATCH AND ALTERNATIVE ANSWER

BACKGROUND OF THE INVENTION

1. Technical Field

The present invention relates generally to search engines, and more particularly, to a search engine for a knowledge base that is capable of determining a match answer and an alternative answer based on a history record of cumulative probability values.

2. Related Art

Conventional search engines are located on a server side of a client-server environment. As a result, application of these search engines relative to knowledge bases that are located client-side is very difficult. For example, a knowledge base loaded to a portable digital assistant is incapable of searching unless communicable with a server-side search engine. Even if the client-side is readily communicable with the server-side search engine, processing delays such as database or application server requests (from client to server) affect performance. Performance problems are generally related to the Javascript or Perl front-end loaded nature of conventional server side systems and their related back-end DB2 or Oracle servers.

Conventional search-engines also do not address locating exact information that a user requests since they apply very complex layers of software abstraction, e.g. the Berkley search engine strategy and artificial intelligence algorithms.

Other disadvantages of conventional search engines is their inability to learn from prior searches for a user relative to a given knowledge base. That is, they do not readily provide user preferences relative to a knowledge base.

In view of the foregoing, there is a need in the art for a search engine that is client-side, high performance and learns user preferences.

SUMMARY OF THE INVENTION

The invention provides a search engine that is client-side, provides high performance and creates user preference relative to a knowledge base. The invention is natural language based. In addition, it is applicable to a variety of knowledge bases and can be adapted to other applications such as on-line help, interactive training, wizard functions, virtual chat sessions, intelligent bots, etc.

A first aspect of the invention is directed to a method of searching for data in a knowledge base having a plurality of categories based on a search keyword, each category having respective keyword data, the method comprising the steps of: determining a match answer category by searching the keyword data for a match to the search keyword; assigning a first weighted probability value to each category having a keyword that matches the search keyword; assigning a second weighted probability value to each category having a shared keyword, other than the search keyword, in respective keyword data to that of the match answer category; assigning a third weighted probability value to each category related to the match answer category in a relation table; updating cumulative probability values of a history record with the assigned weighted probability values; and determining an alternative answer category based on a highest cumulative probability value for the match answer category.

A second aspect of the invention is directed to a search engine system for searching a knowledge base having a plurality of categories based on a search keyword, the search engine system comprising: a match module that determines a match answer category based on a search keyword; an alternative answer module including: a probability value assigner that: assigns a first weighted probability value to each category having a keyword that matches the search keyword; assigns a second weighted probability value to each category having a shared keyword, other than the search keyword, in respective keyword data to that of the match answer category; assigns a third weighted probability value to each category related to the match answer category in a relation table; an updater that updates a history record of cumulative probability values created over time based on the assigned weighted probability values; and an answer determinator that determines an alternative answer category based on a highest cumulative weighted probability value for the match answer category.

A third aspect of the invention is directed to a computer program product comprising a computer useable medium having computer readable program code embodied therein for searching a knowledge base based on a search keyword, the program product comprising: program code configured to determine a match answer category by searching the keyword data for a match to the search keyword; program code configured to assign a first weighted probability value to each category having a keyword that matches the search keyword; program code configured to assign a second weighted probability value to each category having a shared keyword, other than the search keyword, in respective keyword data to that of the match answer category; program code configured to assign a third weighted probability value to each category related to the match answer category in a relation table; program code configured to update cumulative probability values of a history record with the assigned weighted probability values; and program code configured to determine an alternative answer category based on a highest cumulative probability value for the match answer category.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIG. 6 shows a probability matrix table including weighted probability values;

FIG. 7–8 show history records including cumulative probability values created over time.

DETAILED DESCRIPTION OF THE INVENTION

Figure 1:
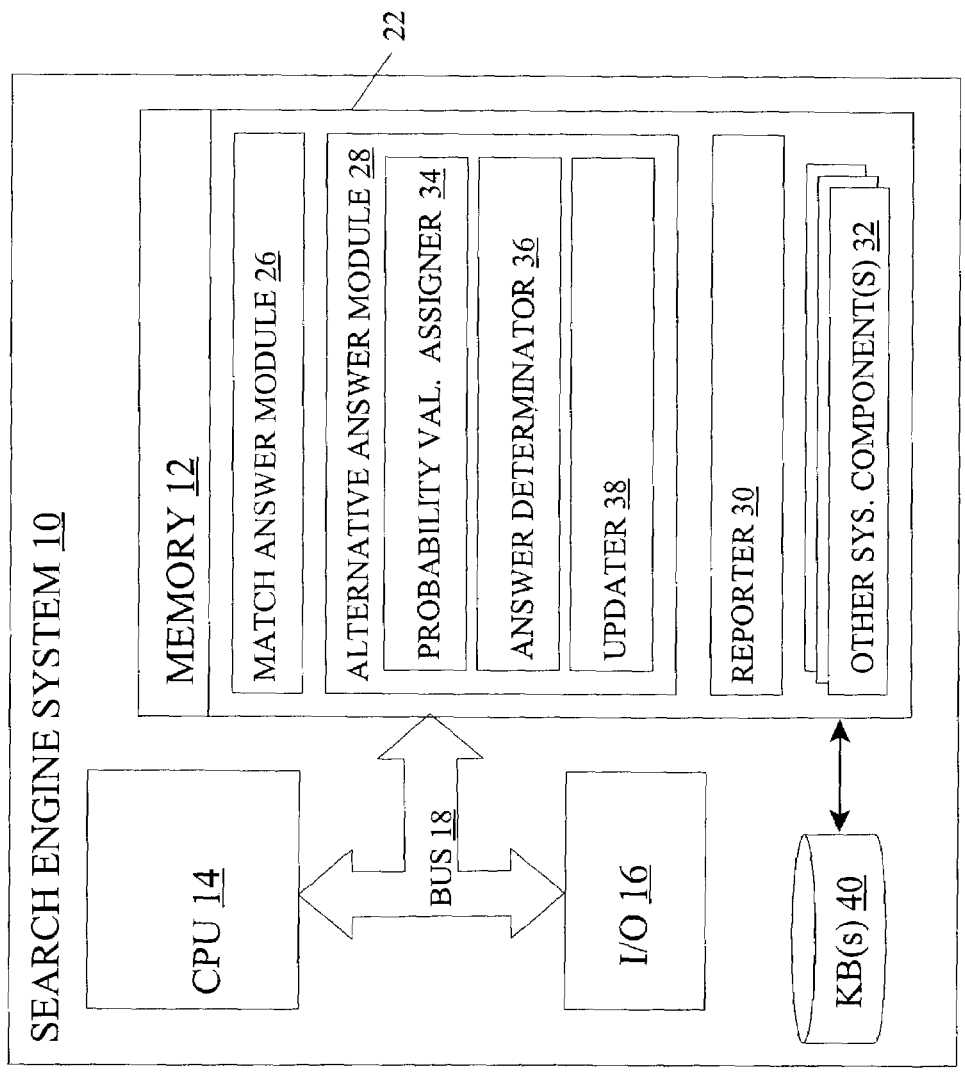
FIG. 1 shows a block diagram of a search engine system.

With reference to the accompanying drawings, FIG. 1 is a block diagram of a search engine system 10 in accordance with the invention. Search engine system 10 includes a memory 12, a central processing unit (CPU) 14, input/output devices (I/O) 16 and a bus 18. Memory 12 includes a program product 22 that, when executed by CPU 14, comprises various functional capabilities described in further detail below. Knowledge base(s) 40 may be provided as part of system 10 or separately. Memory 12 may comprise any known type of data storage system and/or transmission media, including magnetic media, optical media, random access memory (RAM), read only memory (ROM), a data object, etc. Moreover, memory 12 may reside at a single physical location comprising one or more types of data storage, or be distributed across a plurality of physical systems. CPU 14 may likewise comprise a single processing unit, or a plurality of processing units distributed across one or more locations. A processor may utilize standard operating system software, which is designed to drive the operation of the particular hardware and which is compatible with other system components and I/O controllers. I/O 16 may comprise any known type of input/output device including a network system, modem, keyboard, mouse, scanner, voice recognition system, CRT, printer, disc drives, etc. Additional components, such as cache memory, communication systems, system software, flash memory, etc., may also be incorporated into system 10.

As shown in FIG. 1, program product 22 may include a match answer module 26, an alternative answer module 28, a reporter 30 and other system components 32. Alternative answer module 28 may include a probability value assigner 34, an answer determinator 36 and an updater 38.

Search engine system 10 is provided on a client-side of operations. In this embodiment, knowledge base(s) 40 is loaded to system 10. In this way, various knowledge bases of information can be exchanged so that a specific repository of domain-specific knowledge can be targeted. A history record or user preference, as will be described below, can be built for each knowledge base.

Figure 2:
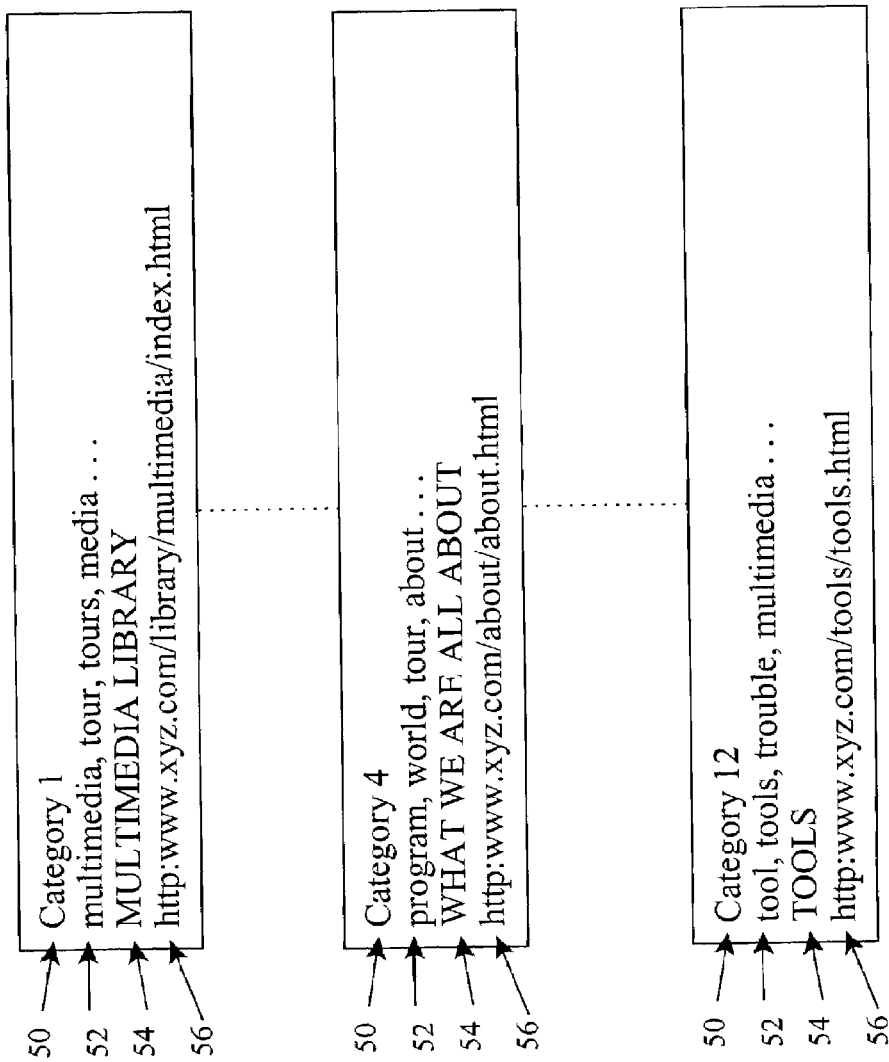
FIG. 2 shows organization of a knowledge base.

Referring to FIG. 2, a schematic organization of a knowledge base 40 is shown. As indicated, knowledge base 40 is organized into a plurality of categories 50 of subject matter. Each category includes respective keyword data 52 that includes keyword(s) that describe the subject matter of the corresponding category 50. Each category also may include a title or other descriptor 54 and an information locator 56. As indicated, an exemplary locator 56 may be a uniform resource locator (URL). However, locator 56 may be any other mechanism or indicator for indicating the location of corresponding category subject matter.

Figure 3:
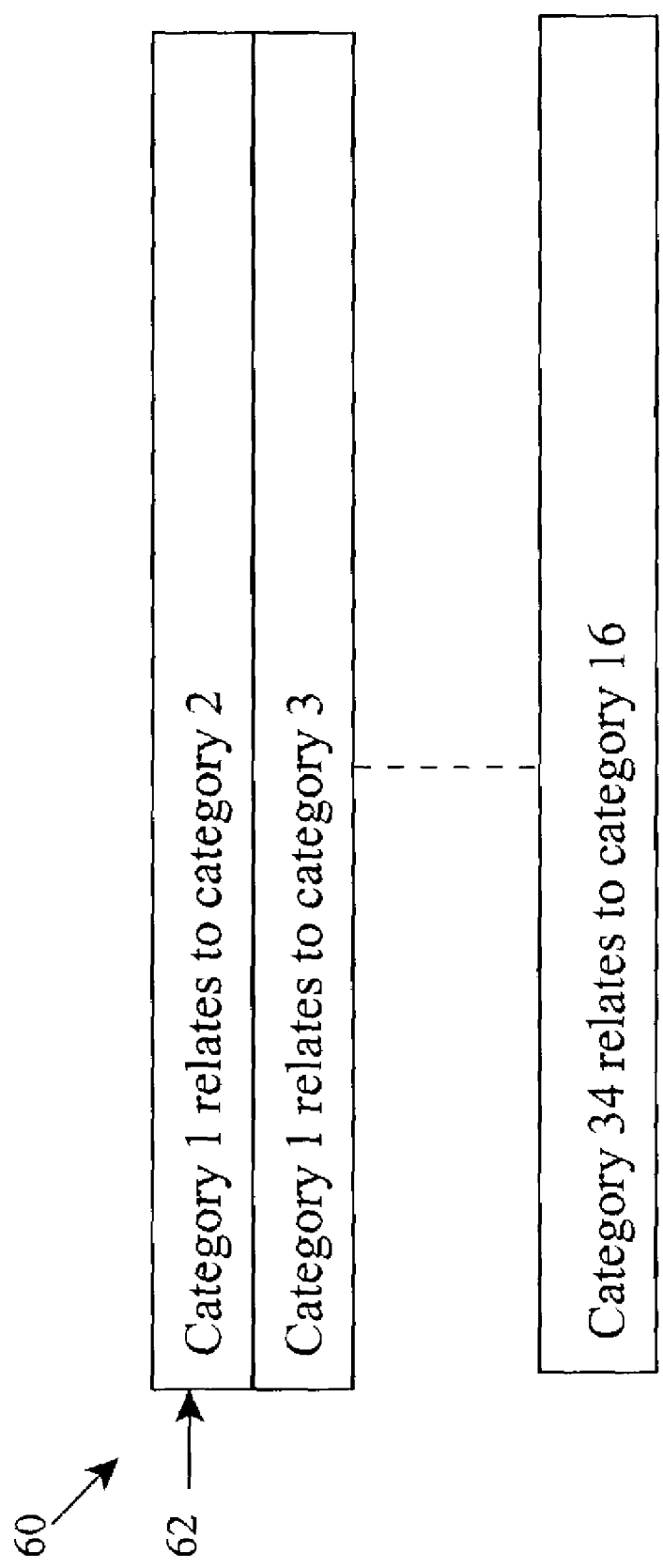
FIG. 3 shows a relation table that relates categories of the knowledge base.

As will be described below, the invention provides a search engine system 10 that allows for searching based on keyword data 54. In addition, a relation table 60, shown in FIG. 3, may be provided which relates categories to one another that do not necessarily have a relation that is expressible in terms of common keywords. That is, categories that seemingly have diverse subject matter may be related to one another through relation table 60. As indicated, relation table 60 includes a listing of category relations 62, e.g., category 1 with category 2, category 1 with category 3, category 34 with category 60, etc.

Figure 4:
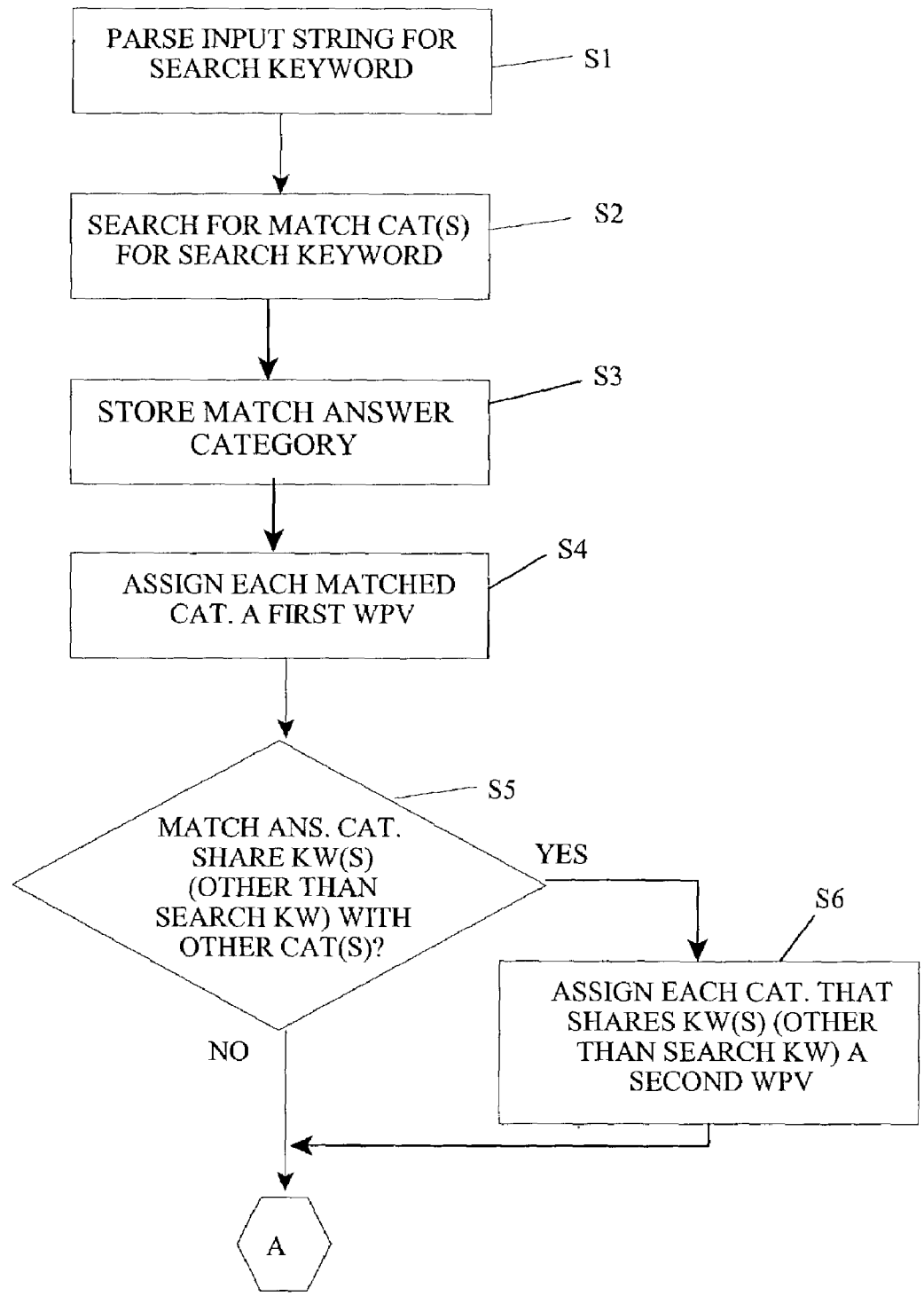
FIGS. 4–5 show flow diagrams of logic for the system of FIG. 1.
Figure 5:
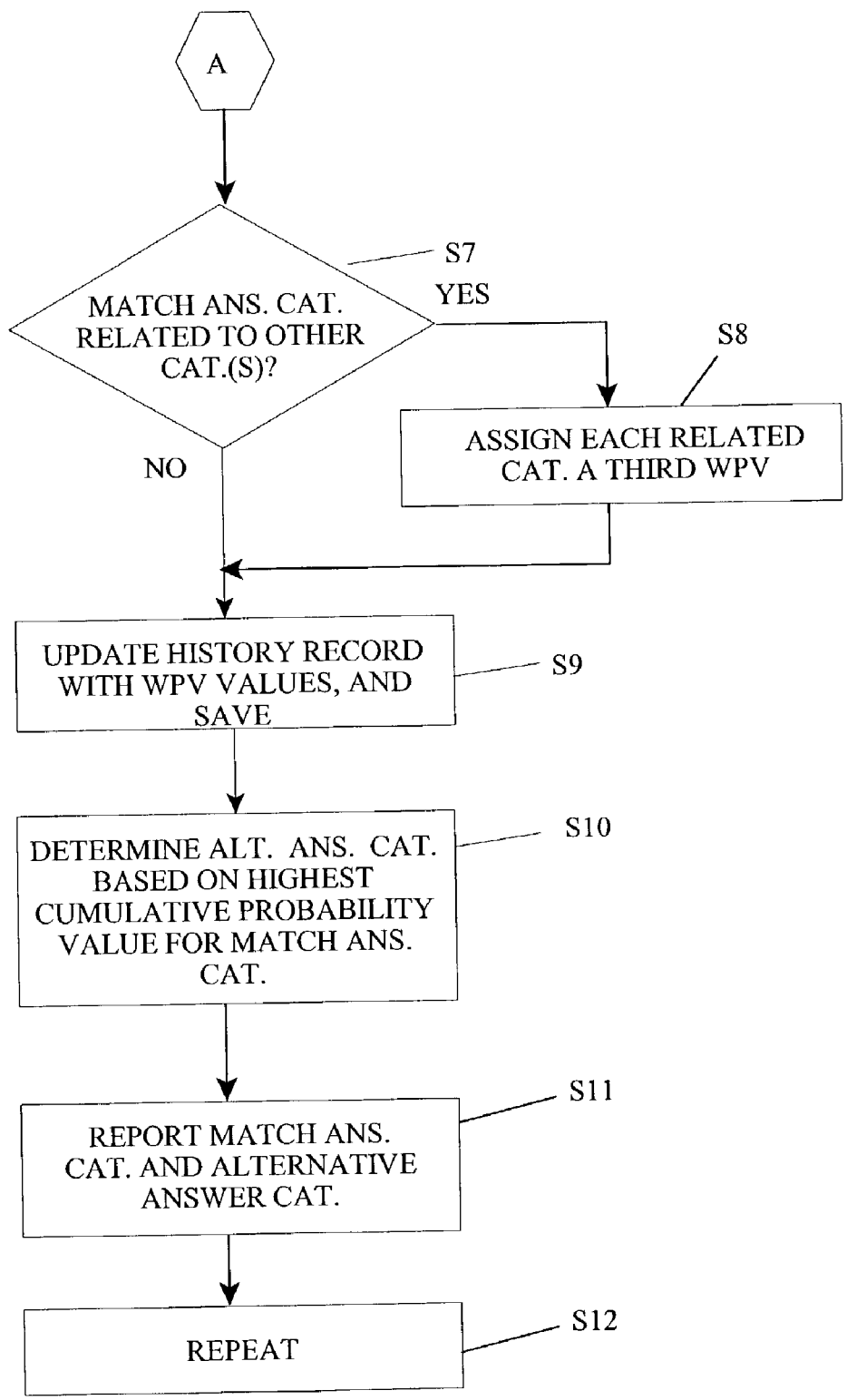

Referring to FIGS. 4–5, logic of system 10 and the methodology of the invention will be described. Precursor steps to the logic may include loading knowledge base 40 into read only memory on a client-side system.

In a first step S1, an input string, which may be a natural language based string, is parsed for a search keyword by match answer module 26. Any now known or later method of tokenizing the input string and determining which terms are more important may be used.

In step S2, knowledge base 40 is searched for a match to the search keyword by match answer module 26. In particular, the collective keyword data 52 (FIG. 2) of all of the categories are searched for a match. A category having a match for the search keyword in its keyword data is referred to as a "matched category." As there may be more than one matched category, a mechanism for choosing a "match answer category," i.e., a matched category that will be outputted as the best matched category, may be implemented in a known fashion. For instance, the first occurrence may be noted as the match answer category for reporting purposes. The match answer category is saved in step S3.

In step S4, each matched category found is assigned a first weighted probability value (WPV) by probability value assigner 34 of alternative answer module 28. For description purposes, the first weighted probability value may be 0.3. It should be recognized, however, that the first weighted probability value (and other weighted probability values described below) can be altered to accommodate user preferences.

In step S5, a determination is made by answer determinator 36 of alternative answer module 28 as to whether the match answer category has a shared keyword, i.e., a keyword other than the search keyword, with other category (ies). If so, each category that shares a keyword(s) with the match answer category is assigned a second weighted probability value by probability value assigner 34 in step S6. The second weighted probability value may be, for example, 0.2.

In step S7 (FIG. 5), a determination is made by answer determinator 36 as to whether the match answer category is related to another category by other than a keyword. In this case, relation table 60 (FIG. 3) is referenced to see if a relation exists. If a relation does exist, a third weighted probability value is assigned to the category by probability value assigner 34 in step S8. The third weighted probability value may be, for example, 0.1. Hence, the progression from first, to second, to third weighted probability value is a diminishing progression to symbolize the lower likelihood that someone looking for the match answer category is also interested in the other categories with weighted probability values assigned.

Referring to FIG. 6, the above-described weighted probability values can be saved in, for example, a table, which may be referred to as a probability matrix table (PMT) 64. Where more than one value may be assigned to a category relationship, the highest weighted probability value is given.

In step S9, an initial history record 66 (FIG. 7) is updated with the probability values from PMT 64 by updater 38. A "history record" is a record such as a table that compares each category with each other category based on cumulative probability values created over time. When the history record is updated, PMT 64 probability values are accumulated in corresponding cells of initial history record 66 to create an updated history record 68 (FIG. 8). Accumulation may be conducted in any now known or later developed process. In one embodiment, accumulation will be had by simple addition. Saving of the history record after updating may also be completed as part of step S9.

In step S10, an alternative answer category is determined based on a highest cumulative probability value for the match answer category in the updated history record. For example, if the match answer category is category 1, the highest cumulative probability value is 0.6 for category 12. Hence, category 12 is the alternative answer category. In the case, that the match answer category does not include any cumulative probability values, i.e., a 0 is recorded, the alternative answer is made to indicate that no alternative answer is known.

Figure 9:
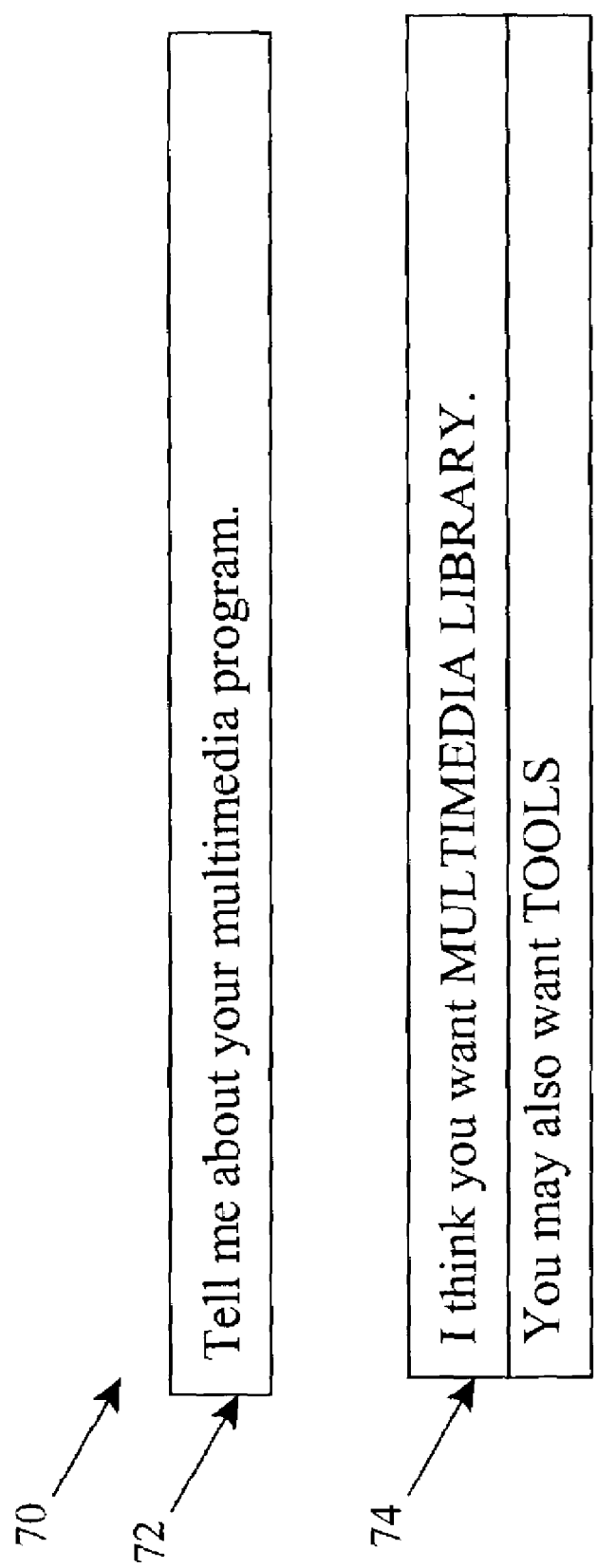
FIG. 9 shows an interface for the system of FIG. 1.

In step S11, the match answer category and alternative answer category are reported by reporter 30 (FIG. 1). As shown in FIG. 9, an interface 70 including an input area 72 and an output area 74 for reporting the answer categories may be provided in a natural language format that is interactive.

As a final step, step S12, the above processes may be repeated with another search.

To illustrate operation of search engine system 10, suppose a user inputs "Tell me about your multimedia programs." (FIG. 9) A parsing of this input string would lead to a search keyword of, for example, "multimedia." Based on the above knowledge base 40 shown in FIG. 2, this would lead to a match answer category for category 1 because that category has keyword data 52 that includes the exact term "multimedia." Reporter 30 may output, as shown in FIG. 9, "I think you want MULTIMEDIA LIBRARY." The output may be provided as a hypertext link to the subject matter for category 1.

Referring to FIGS. 2 and 6, since category 12 also includes the search keyword "multimedia," it is assigned a first weighted probability value of 0.3 relative to category 1. Further, since category 4 includes a keyword (not the search keyword), e.g., "tool," that is the same as a category 1 keyword, category 4 would be assigned a second weighted probability value of 0.2 in PMT 64 (FIG. 6). Further, referring to FIG. 3, categories 2 and 3 are related to category 1 for some other reason not demonstrable by keywords by relation table 60. Accordingly, these categories are assigned a third weighted probability value of 0.1 in PMT 64 (FIG. 6).

The weighted probability values of PMT 64, when combined with the cumulative probability values of initial history record 66 (FIG. 7), lead to updated history record 68 (FIG. 8). When alternative answer module 28 searches for an alternative answer, category 12 is indicated as the alternative answer category since it has the highest cumulative probability value. As shown in FIG. 9, reporter 30 may output "You may also want TOOLS." This output may also may also be provided as a hypertext link to the subject matter for category 12.

The above process can repeat itself until the user ends the search. The more time the user spends, the more the history record is updated, refined, and translated into personal preferences relative to that knowledge base. Since system 10 is client-side, the system provides high performance compared to server-side systems. The natural language format makes the system user friendly. In addition, system 10 is applicable to a variety of knowledge bases, each with their own associated history record. Further, system 10 can be adapted to other applications such as on-line help, interactive training, wizard functions, virtual chat sessions, intelligent bots, etc.

In the previous discussion, it will be understood that the method steps discussed are performed by a processor, such as CPU 14 of system 10, executing instructions of program product 22 stored in memory. In one embodiment, program product 22 (FIG. 1) may be implemented in the Java environment. For instance, it may be a thin Java applet, which can be further refined relative to coding techniques, more efficient optimizations, libraries, etc. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method of searching for data in a knowledge base having a plurality of categories based on a search keyword, each category having respective keyword data, the method comprising the steps of:

determining a match answer category by searching the keyword data for a match to the search keyword;

assigning a first weighted probability value to each category having a keyword that matches the search keyword;

assigning a second weighted probability value to each category having a shared keyword, other than the search keyword, in respective keyword data to that of the match answer category;

assigning a third weighted probability value to each category related to the match answer category in a relation table, wherein the third weighted probability value is determined independent from the search keyword and the shared keyword;

updating cumulative probability values of a history record with the assigned weighted probability values;

determining an alternative answer category based on a highest cumulative probability value for the match answer category;

reporting the match answer category and the alternative answer category; and saving the history record after updating.

2. The method of claim 1, further comprising the step of loading the knowledge base into read only memory.

3. The method of claim 1, wherein when more than one category is determined to be the match answer category, a first occurrence is reported as the match answer category.

4. The method of claim 1, wherein the history record compares each category with each other category based on the cumulative probability values.

5. The method of claim 1, wherein the search keyword is parsed from a natural language input string.

6. The method of claim 1, wherein the step of updating the history record includes adding the assigned weighted probability values to saved cumulative probability values.

7. A search engine system for searching a knowledge base having a plurality of categories based on a search keyword, the search engine system comprising:

a match module that determines a match answer category based on a search keyword;

an alternative answer module including:

a probability value assigner that:

assigns a first weighted probability value to each category having a keyword that matches the search keyword;

assigns a second weighted probability value to each category having a shared keyword, other than the search keyword, in respective keyword data to that of the match answer category;

assigns a third weighted probability value to each category related to the match answer category in a relation table, wherein the third weighted probability value is determined independent from the search keyword and the shared keyword;

an updater that updates a history record of cumulative probability values created over time based on the assigned weighted probability values;

an answer determinator that determines an alternative answer category based on a highest cumulative weighted probability value for the match answer category; and a reporter for reporting the match answer category and the alternative answer category.

8. The search engine system of claim 7, wherein the knowledge base is loaded into read only memory on a client-side system.

9. The search engine of claim 7, wherein when more than one category is determined to be the match answer category, a first occurrence is reported as the match answer category.

10. A computer program product comprising a computer useable medium having computer readable program code embodied therein for searching a; knowledge base based on a search keyword, the program product comprising:

program code configured to determine a match answer category by searching the keyword data for a match to the search keyword;

program code configured to assign a first weighted probability value to each category having a keyword that matches the search keyword;

program code configured to assign a second weighted probability value to each category having a shared keyword, other than the search keyword, in respective keyword data to that of the match answer category;

program code configured to assign a third weighted probability value to each category related to the match answer category in a relation table, wherein the third weighted probability value is determined independent from the search keyword and the shared keyword;

program code configured to update cumulative probability values of a history record with the assigned weighted probability values;

program code configured to determines an alternative answer category based on a highest cumulative probability value for the match answer category; and program code configured to report the match answer category and the alternative answer category; and program code configured to save the history record after updating.

11. The program product of claim 10, wherein when more than one category is determined to be the match answer category, a first occurrence is reported as the match answer category.

12. The program product of claim 10, wherein the history record compares each category with each other category based on the cumulative probability values.

13. The program product of claim 10, wherein the search keyword is parsed from a natural language input string.

14. The program product of claim 10, wherein the step of updating the history record includes adding the assigned weighted probability values to saved cumulative probability values.

15. The product of claim 10, wherein the computer useable medium is loaded to a client-side system.

* * * * *